Figure 1:
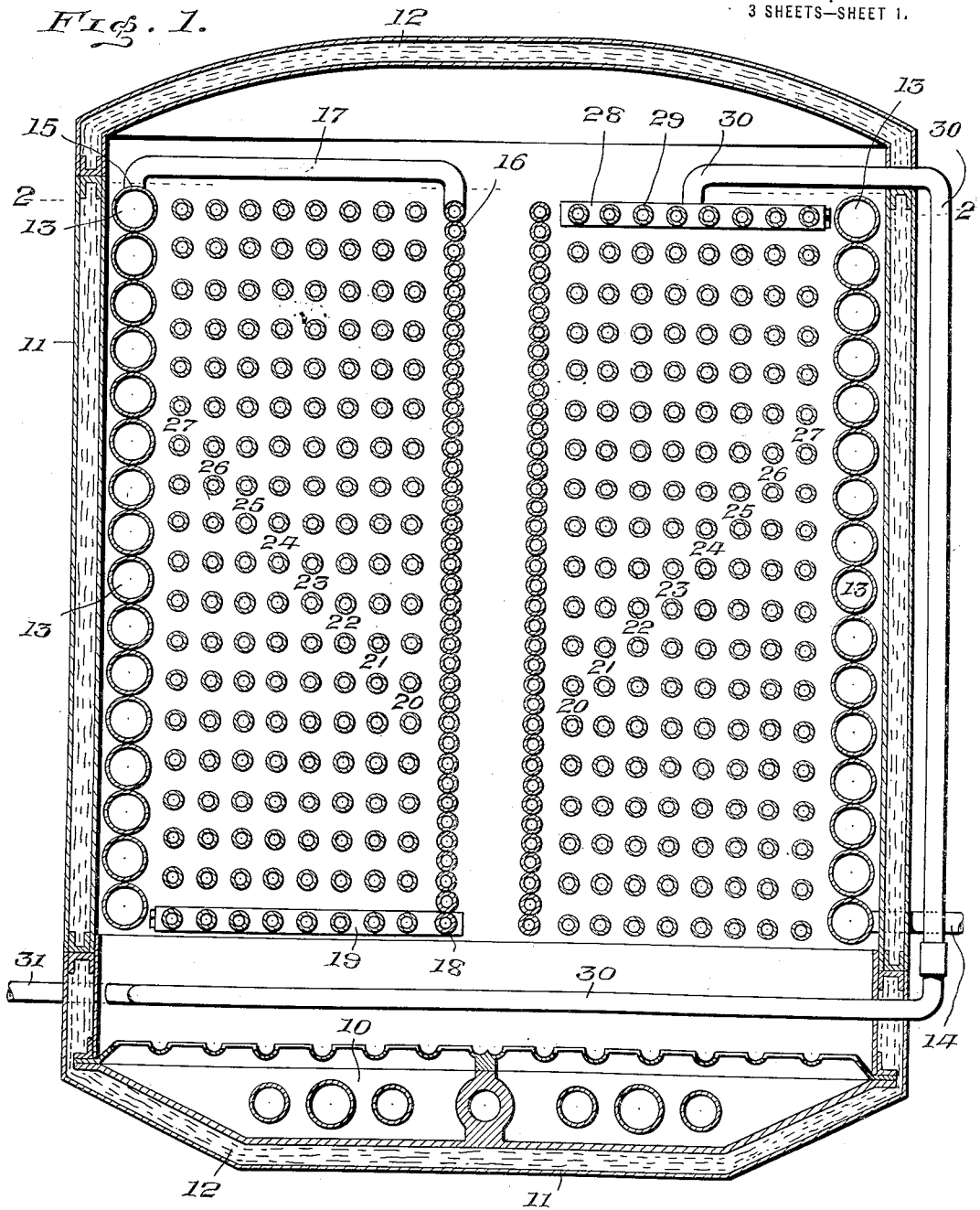

H. O. BAKER.
WATER TUBE BOILER.
APPLICATION FILED FEB. 23, 1918.

1,336,714.

Patented Apr. 13, 1920.

3 SHEETS—SHEET 1.

Inventor
Hartley O. Baker
Fitz Gerald & Co
Attorneys

H. O. BAKER.
WATER TUBE BOILER.
APPLICATION FILED FEB. 23, 1918.
1,336,714.
Patented Apr. 13, 1920.
3 SHEETS—SHEET 2.
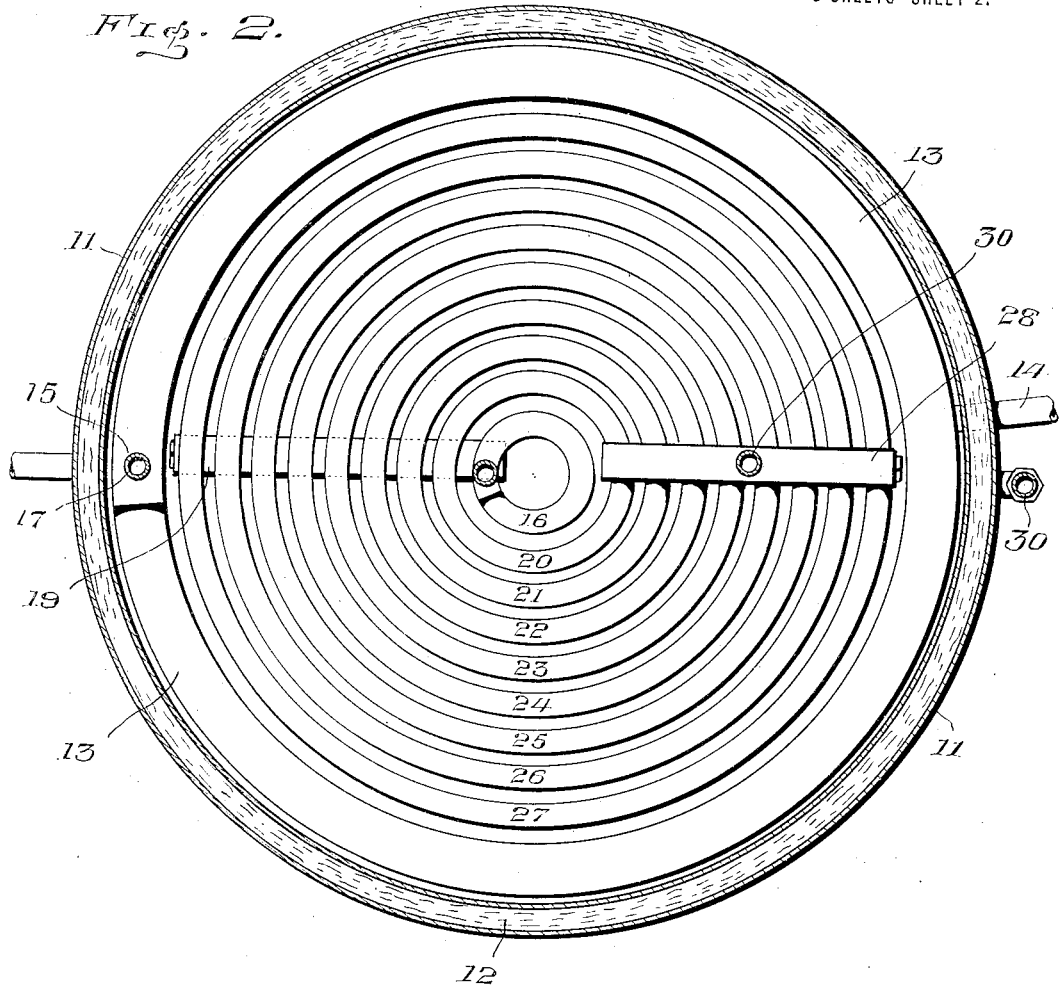
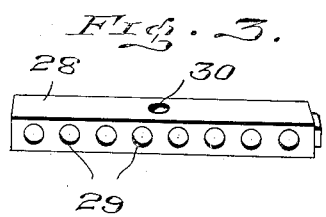
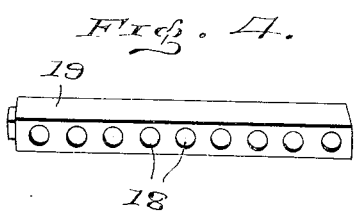
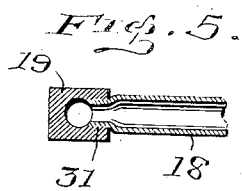
Inventor
Hartley O. Baker
FitzGerald & Co
Attorneys

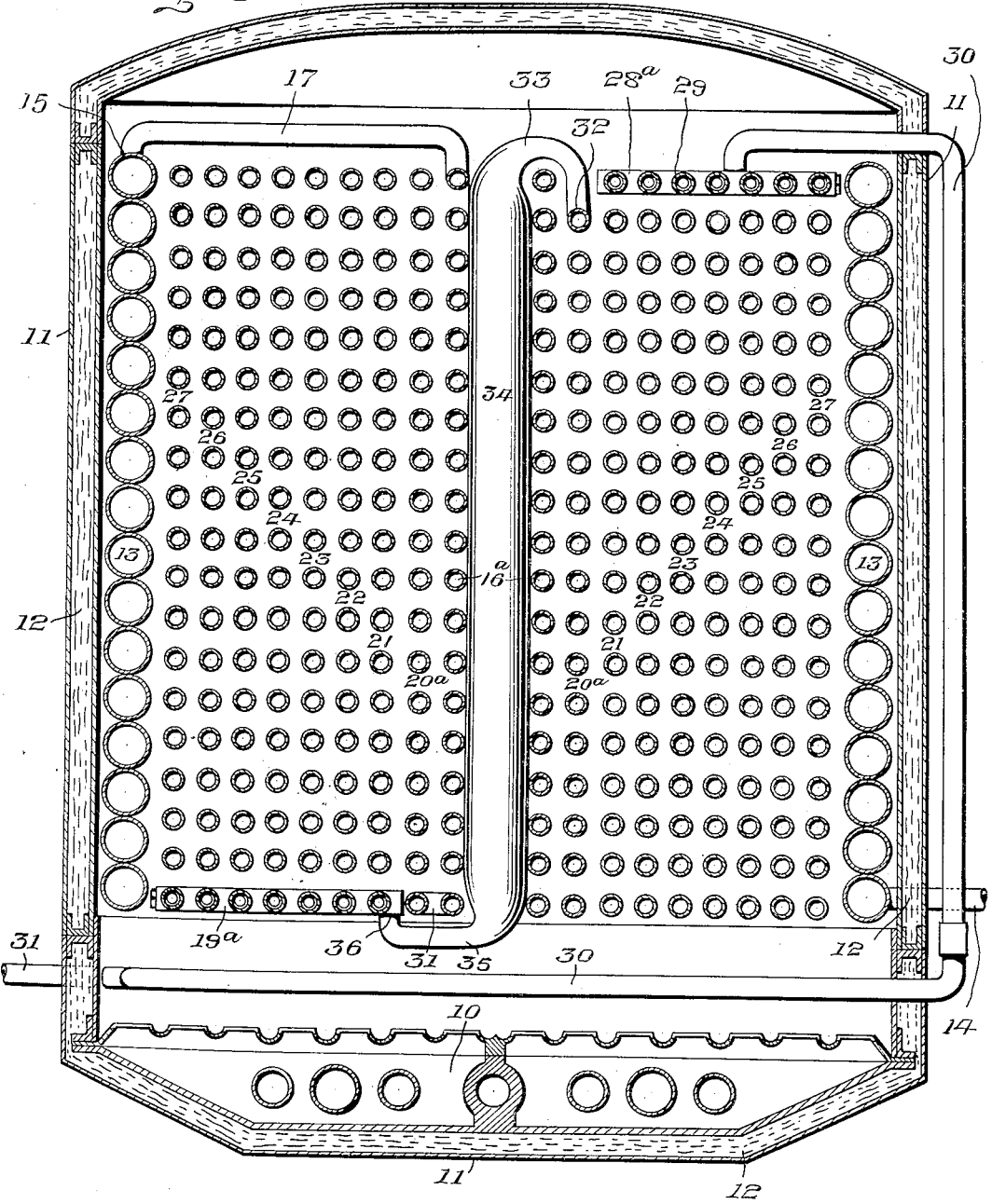

UNITED STATES PATENT OFFICE.

HARTLEY O. BAKER, OF PUEBLO, COLORADO, ASSIGNOR TO THE BAKER STEAM MOTOR CAR AND MANUFACTURING CO., INC., OF PUEBLO, COLORADO.

WATER-TUBE BOILER.

1,336,714. Specification of Letters Patent. Patented Apr. 13, 1920.

Application filed February 23, 1918. Serial No. 218,852.

*To all whom it may concern:*

Be it known that I, HARTLEY O. BAKER, a citizen of the United States, residing at Pueblo, in the county of Pueblo and State of Colorado, have invented certain new and useful Improvements in Water-Tube Boilers; and I do hereby declare the following to be a full, clear, and exact description of the invention, such as will enable others skilled in the art to which it appertains to make and use the same.

This invention is in the nature of a water tube boiler and has for its general object to generally improve the construction and operation of such boilers while at the same time to simplify and cheapen their construction.

In carrying out these objects, the invention consists in the improved construction, arrangement and combination of parts which will be hereinafter fully described and afterward particularly claimed.

In order that the construction and operation thereof may be readily comprehended, I have illustrated an approved embodiment of my invention, and a modification thereof, in the accompanying drawings, and will now proceed to fully and specifically describe the same in connection with said drawings, in which—

Figure 1 represents a sectional view of my boiler on a vertical plane cutting centrally therethrough, Fig. 2, a horizontal sectional view on the plane indicated by the dotted line 2—2 of Fig. 1, Fig. 3, a detail perspective view of the top header, detached, Fig. 4 is a detailed perspective view of the bottom header, detached, Fig. 5, a detail sectional view illustrating the junction of the end of one of the pipes with a header, and Fig. 6, a view similar to Fig. 1, illustrating a slight modification.

Like reference characters indicate the same parts wherever they occur in the several drawings.

Referring specifically to the drawings, 10 indicates the burner by which the heat is furnished and this may be of any approved construction, being located in the bottom of the casing 11, which is hollow and filled with asbestos as at 12, although other constructions of casing might be used if desired.

The casing in this instance is cylindrical and just within its walls is mounted a vertical helical coil 13, the turns of which extend entirely around the casing, near its inner wall, and rise, one above another to near the top of the casing, the water being pumped into this coil by the power pumps of the engine, entering the coil through a pipe 14 in its bottom turn and passing around upward through the succeeding coils to the upper turn at 15.

A second smaller vertical helical water coil 16 is mounted in the center of the casing and a pipe 17 connects the upper turn of coil 13 with the upper turn of said second coil so that water from the outer coil 13 is passed into the inner water coil 16 through which it passes downward to the bottom turn from which it passes at 18 into a bottom header or manifold 19.

This header is connected to the bottom turn of each of a series of concentric vertical coils 20, 21, 22, 23, 24, 25, 26 and 27 of increasing diameters from the inner coil 20 to the outer coil 27, and the water from the coils 13 and 16 passes upward through said series of coils specified.

The upper ends of the helical coils 20 to 27, enter an upper or top header or manifold 28 at the points 29 from which the steam now made passes out by means of a pipe 30 to a point 31 or other place for use.

The ends of the coils are swaged, or reduced in size, as at 31, as illustrated in Fig. 5, said reduced ends being entered into header as 19, and welded therein.

As before stated, the coils 13 and 16 are water coils while the coils 20 to 27 inclusive are steam coils, the water passing through the water coils and into the steam coils being spared from the fire and heat inside, converted into steam, which as before stated rises to the top header whence it passes through the pipe 30 to the outside of the boiler casing, passing through a super-heating coil to the point 31 or other place for use, said super-heating coil forming a continuation as it were of the pipe 30 and being located in the fire box. This super-heating coil may be of any desired form.

This boiler may be made of wrought iron pipe or seamless steel tubing, the tubing of the water coil 13 being larger in diameter than any of the rest of the tubing or pipes while the inner water heating coil 16 is made of any suitable tubing material and is of a diameter of about one-half or less than the coil 13.

The series of coils 20 to 27 will be made substantially of the same size as the water coil 16 but no ironclad rule for the diameters of these pipes is necessary.

The series of coils 20 to 27 are composed of turns one above the other the turns of adjacent coils being separated from each other any desired distance and the turns of one coil may be staggered with those of the adjacent coils.

There may be eight of these coils 20 to 27, or more or less, to suit different sizes of boilers.

The headers will be made of square steel bored through endwise sufficiently far to leave a closed end, the opposite end being plugged after which the holes are bored through the sides to receive the series of coils so that they will all be connected together through these mediums, thus thoroughly distributing the water in these coils where it is exposed to the heat to be converted into steam.

In the modified form shown in Fig. 6 the parts are similar to those of Fig. 1 with the following exceptions:

The water passes into the outer water coil 13 in the same manner as in the described construction and is passed through a pipe to the inner coil $20^a$ whence it passes downward through that coil the bottom of which is connected at 31 with the next vertical coil outside of the coil just described. The water or steam passes up through the latter coil and at 32 enters the top turn of the last named coil preferably on the opposite side of the center of the casing from which it passes through a pipe 33 to a large vertical pipe 34 located within the center coil, to the bottom thereof and thence through a pipe 35, entering at 36 a bottom header $19^a$ which receives the lower turns of all the rest of the coils of the series whereby the water passes upward into these coils, and is exposed to the heat until it passes out through the upper turns of these coils into a top header $8^a$ from whence it is conducted by a suitable pipe in the same manner with relation to the construction of Fig. 1 through a super-heater pipe and out to any point of use or distribution.

Among the advantages of this construction of boiler is that the outer water coil acts as an insulator or protector to the casing as the water is poured through it and takes up its heat thereby keeping it cool. The water at the same time being heated thus holding a large reserve of water. The center water heating coil delivers the heated water to the steam producing coils 20 to 27 at the boiling point or nearly so making a very rapid steam producer in the lower convolutions of the coils 20 to 27. The space above the water level surface in said coils contains a reserve supply of steam. The coils 20 to 27 jointly have a large steam capacity compared with the tubing of the coils 13 and 16 and the coils 20 to 27 have a large heating surface by dividing the steam passage into small conduits.

The construction is very readily and cheaply made and it is non-explosive as there is no sufficient volume in any given space or tube to cause an explosion. Repairs to this construction may be easily and cheaply made and mineral waters affected very little.

Having thus fully described my invention, what I claim and desire to secure by Letters Patent of the United States, is:

A steam generator comprising a vertical helical water coil of tubing of relatively large diameter for holding a considerable quantity of water in reserve, a plurality of concentric vertical helical coils within the water coil and each of tubing of considerably smaller diameter than the tubing of the water coil, a header to which the upper ends of the last named coils are connected, a header to which the lower ends of the last named coils are connected, a water supply pipe connected to the water coil at the lower end thereof, means centrally within the last named coils for conducting water downwardly therein at the center of the generator, the upper end of said means being connected to the upper end of the water coil to receive the water after flowing upwardly in the water coil and to flow downwardly centrally within the generator, and the lower end of said means being connected to the lower header for the flow of water upwardly in the last named coils after passing downwardly centrally within the generator, and a steam outlet pipe connected to the header at the upper ends of the last named coils.

In testimony whereof I have signed my name to this specification in the presence of two subscribing witnesses.

HARTLEY O. BAKER.

Witnesses:
SARA McKENZIE,
PAULINE S. BROWN.